US007426445B1

(12) United States Patent
Fister

(10) Patent No.: US 7,426,445 B1
(45) Date of Patent: Sep. 16, 2008

(54) MEASURING TEMPERATURE CHANGE IN AN ELECTRONIC BIOMEDICAL IMPLANT

(75) Inventor: Michael L. Fister, Simi Valley, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 0 days.

(21) Appl. No.: 11/676,202

(22) Filed: Feb. 16, 2007

Related U.S. Application Data

(63) Continuation of application No. 11/130,644, filed on May 16, 2005, now Pat. No. 7,200,504.

(51) Int. Cl.
G01R 23/00 (2006.01)
G01K 7/00 (2006.01)
(52) U.S. Cl. .......................... 702/75; 702/130
(58) Field of Classification Search .............. 702/75, 702/99, 130–132, 136; 607/29, 33, 57
See application file for complete search history.

(56) References Cited

U.S. PATENT DOCUMENTS

| 4,481,950 | A |   | 11/1984 | Duggan |
| 4,562,751 | A |   | 1/1986 | Nason et al. |
| 4,678,408 | A |   | 7/1987 | Nason et al. |
| 4,685,903 | A |   | 8/1987 | Cable et al. |
| 5,080,653 | A |   | 1/1992 | Voss et al. |
| 5,097,122 | A |   | 3/1992 | Colman et al. |
| 5,193,539 | A |   | 3/1993 | Schulman et al. |
| 5,193,540 | A |   | 3/1993 | Schulman et al. |
| 5,234,692 | A |   | 8/1993 | Magruder et al. |
| 5,234,693 | A |   | 8/1993 | Magruder et al. |
| 5,312,439 | A |   | 5/1994 | Loeb |
| 5,314,458 | A |   | 5/1994 | Najafi et al. |
| 5,501,703 | A |   | 3/1996 | Holsheimer et al. |
| 5,704,352 | A | * | 1/1998 | Tremblay et al. ........... 600/300 |
| 5,728,396 | A |   | 3/1998 | Peery et al. |
| 5,938,688 | A |   | 8/1999 | Schiff |
| 6,016,449 | A |   | 1/2000 | Fischell et al. |
| 6,051,017 | A |   | 4/2000 | Loeb et al. |
| 6,164,284 | A |   | 12/2000 | Schulman et al. |

(Continued)

FOREIGN PATENT DOCUMENTS

WO    WO 01/82398    11/2001

(Continued)

*Primary Examiner*—Bryan Bui
(74) *Attorney, Agent, or Firm*—Wong, Cabello, Lutsch, Rutherford & Brucculeri, LLP

(57) ABSTRACT

The change in temperature of an implanted electronic device can be determined by providing power to one or more circuit elements included in the implanted electronic device, wherein the circuit elements comprise a non-crystal oscillator. A shift in the output frequency associated with the non-crystal oscillator can be detected, and the temperature change of the implanted electronic device can be determined based on the detected output frequency shift. One or more signals based on the output frequency associated with the non-crystal oscillator can be transmitted by the implanted electronic device. The transmitted signals can be received by an external device, which can detect the current output frequency associated with the non-crystal oscillator from the transmitted signals and compare the current output frequency with a previous output frequency to determine the output frequency shift associated with the non-crystal oscillator. The output frequency can, for example, be converted to a voltage measure.

23 Claims, 9 Drawing Sheets

U.S. PATENT DOCUMENTS

| | | |
|---|---|---|
| 6,185,452 B1 | 2/2001 | Schulman et al. |
| 6,208,894 B1 | 3/2001 | Schulman et al. |
| 6,219,580 B1 | 4/2001 | Faltys et al. |
| 6,272,382 B1 | 8/2001 | Faltys et al. |
| 6,280,873 B1 | 8/2001 | Tsukamoto |
| 6,308,101 B1 | 10/2001 | Faltys et al. |
| 6,368,315 B1 | 4/2002 | Gillis et al. |
| 6,381,496 B1 | 4/2002 | Meadows et al. |
| 6,458,171 B1 | 10/2002 | Tsukamoto |
| 6,487,446 B1 | 11/2002 | Hill et al. |
| 6,516,227 B1 | 2/2003 | Meadows et al. |
| 6,539,263 B1 | 3/2003 | Schiff et al. |
| 6,553,263 B1 | 4/2003 | Meadows et al. |
| 6,582,441 B1 | 6/2003 | He et al. |
| 6,620,151 B2 | 9/2003 | Blischak et al. |
| 6,666,845 B2 | 12/2003 | Hooper et al. |
| 6,740,072 B2 | 5/2004 | Starkweather et al. |
| 6,760,626 B1 | 7/2004 | Boveja |
| 6,770,067 B2 | 8/2004 | Lorenzen et al. |
| 6,856,838 B2 | 2/2005 | Parramon et al. |
| 2001/0046625 A1 | 11/2001 | Ruth et al. |
| 2001/0053476 A1 | 12/2001 | Ruth et al. |
| 2003/0093131 A1* | 5/2003 | Loeb et al. .................... 607/48 |
| 2003/0229383 A1 | 12/2003 | Whitehurst et al. |
| 2003/0236557 A1 | 12/2003 | Whitehurst et al. |
| 2003/0236558 A1 | 12/2003 | Whitehurst et al. |
| 2004/0015204 A1 | 1/2004 | Whitehurst et al. |
| 2004/0015205 A1 | 1/2004 | Whitehurst et al. |
| 2004/0044383 A1 | 3/2004 | Woods et al. |
| 2004/0059392 A1 | 3/2004 | Parramons et al. |
| 2004/0088032 A1 | 5/2004 | Haller et al. |
| 2004/0098068 A1 | 5/2004 | Carbunaru et al. |
| 2004/0162590 A1 | 8/2004 | Whitehurst et al. |
| 2004/0230231 A1 | 11/2004 | Thacker et al. |
| 2005/0021108 A1 | 1/2005 | Klosterman et al. |
| 2005/0057905 A1 | 3/2005 | He et al. |
| 2005/0102006 A1 | 5/2005 | Whitehurst et al. |
| 2005/0119176 A1 | 6/2005 | Reed et al. |
| 2005/0131494 A1 | 6/2005 | Park et al. |
| 2005/0131495 A1 | 6/2005 | Parramon et al. |
| 2005/0131496 A1 | 6/2005 | Parramon et al. |
| 2005/0143781 A1 | 6/2005 | Carbunaru et al. |
| 2005/0154419 A1 | 7/2005 | Whitehurst et al. |
| 2005/0245971 A1 | 11/2005 | Brockway et al. |

FOREIGN PATENT DOCUMENTS

| | | |
|---|---|---|
| WO | WO 03/005465 | 1/2003 |

* cited by examiner

MEASURING TEMPERATURE CHANGE IN AN ELECTRONIC BIOMEDICAL IMPLANT

CROSS-REFERENCE TO RELATED APPLICATIONS

This application is a continuation of and claims the benefit of U.S. patent application Ser. No. 11/130,644 entitled "Measuring Temperature Change in an Electronic Biomedical Implant", filed on May 16, 2005 now U.S. Pat. No. 7,200,504. The entire disclosure of the above-referenced patent application is incorporated herein by reference.

BACKGROUND

The present disclosure relates to implantable electronic devices and systems, and to temperature detecting strategies employed in conjunction with such devices.

Implantable electronic devices and systems, such as stimulators, can create a stimulus that is transferred to the nerves and tissues of a patient's body in order to treat a variety of biological disorders. Tissues can be stimulated directly or indirectly to elicit a desired response. Direct stimulation involves the provision of one or more stimuli directly to the stimulated tissue while indirect stimulation involves the provision of one or more stimuli to adjacent or otherwise related tissue, where the related tissue causes the desired response to be elicited from the stimulated tissue. The desired response can be inhibitory or excitatory. Inhibitory responses tend to discourage certain behavior by the stimulated tissue, whereas excitatory responses tend to encourage certain behavior by the stimulated tissue. Encouraged or discouraged behaviors can include cellular depolarization, the release of chemical species, and/or the inhibition of cellular depolarization. Tissue can be stimulated, e.g., using electrical, chemical, thermal, electromagnetic, and/or mechanical stimuli.

For example, pacemakers can be used to treat cardiac arrhythmia, defibrillators can be used to treat cardiac fibrillation, cochlear stimulators can be used to treat deafness, retinal stimulators can be used to treat blindness, muscle stimulators can be used to treat paralysis in limbs, spinal cord stimulators can be used to treat chronic pain, cortical and deep brain stimulators can be used to treat motor and psychological disorders, and other neural stimulators can be used to treat disorders such as urinary urge incontinence, sleep apnea, and sexual dysfunction.

As there are a number of different applications, there are similarly varying types of implantable electronic devices and systems. For example, a spinal cord stimulator can be used to treat chronic pain, while a microstimulator can be used to treat disorders such as urinary urge incontinence, sleep apnea, or sexual dysfunction. As such, the design and location of the implantable electronic device can vary with the nature of the application for which it is used. Additionally, the manner in which the device operates can vary with the nature of the application. For example, pain management applications can necessitate the use of more powerful stimulation than the treatment of cardiac arrhythmia or more frequent stimulation than sexual dysfunction applications. Moreover, some patients will require higher power or more frequent stimulation than others, and will therefore also consume more power than other patients with similar devices. As such, the requirements directed to a power source associated with an implantable electronic device also may vary in accordance with the specific patient and application.

Regardless of the application and the individual requirements, however, implantable electronic devices and systems require power from some source to provide the electrical stimulus and to control their own operation. The power source associated with the implantable electronic device can be external to the patient, such as an alternating current power supply. An external power source, however, must be connected to the device in order to deliver power, such as through transcutaneous wires or inductive coupling via an electromagnetic field. Alternatively, the power source can be internal to the patient, such as a battery or a capacitor.

Because an implantable electronic device typically is intended for long-term treatment, it is desirable for the implanted device to operate for an extended period of time. However, devices powered by a primary (non-rechargeable) battery have a finite lifetime and must be surgically removed and replaced when the primary battery is at or near the end of its useful life. Surgical replacement of the power source or the implanted device, however, is not acceptable in many applications.

Where a battery is used as the power source for an implanted electronic device, the battery must have sufficient storage capacity to allow the device to operate for a reasonable length of time. For low-power devices, such as cardiac pacemakers, a primary battery can have an operational life of up to ten years. Implantable electronic devices designed for use in other applications, such as spinal cord stimulators, can demand much greater amounts of power due to higher stimulation rates, pulse widths, or stimulation thresholds. If a primary battery was employed to power such devices, it would require a much larger storage capacity in order for the device to operate for a reasonable length of time. Unfortunately, the amount of additional storage capacity required could result in a device form factor that is too large to implant comfortably or practically within a patient.

Some implantable electronic devices and systems have been designed to use a secondary (rechargeable) battery as the power source, allowing the power stored in the batteries to be periodically replenished through a device charging operation. Thus, a patient with a device powered by a secondary battery can be free of cumbersome external devices and is only required to periodically recharge the power source. The use of a rechargeable battery in an implantable electronic device is described in U.S. Pat. No. 6,553,263, incorporated herein by reference.

The process of recharging the power source associated with an implantable electronic device typically requires close attention by the caregiver or the patient, however. For example, the temperature of the implanted device should not be allowed to rise above a certain threshold during the device charging operation, as a temperature increase in an implanted device can cause the temperature of the surrounding tissue to rise as well.

SUMMARY

The need to measure the change in temperature of an implantable electronic device during a device charging operation and to moderate the charging pattern to control device temperature was recognized by the present inventor. Accordingly, the methods and apparatus described here implement techniques for measuring the temperature of implantable electronic devices, such as stimulators. More specifically, the methods and apparatus described here implement techniques for using the frequency shift associated with the output frequency of a non-crystal oscillator to determine a change in the temperature of an implanted electronic device during a charging operation and to moderate the charging pattern to control device temperature.

In general, in one aspect, the techniques can be implemented to include providing power to one or more circuit elements included in the implanted electronic device, wherein the circuit elements comprise a non-crystal oscillator; detecting a shift in an output frequency associated with the non-crystal oscillator; and determining the change in temperature of the implanted electronic device based on the detected output frequency shift.

The techniques also can be implemented to include transmitting one or more signals based on the output frequency associated with the non-crystal oscillator. The techniques further can be implemented such that at least one of the transmitted signals comprises an unmodulated signal. Additionally, the techniques can be implemented such that one or more of the transmitted signals includes data representing a status of the implanted electronic device.

The techniques also can be implemented such that determining the change in temperature further includes receiving, by an external device, the one or more transmitted signals; detecting a current output frequency associated with the non-crystal oscillator using at least one of the one or more transmitted signals; and comparing the current output frequency with a previous output frequency to determine the shift in the output frequency associated with the non-crystal oscillator. The techniques further can be implemented such that comparing further includes converting the current output frequency and the previous output frequency to a voltage measure. Additionally, the techniques can be implemented to include adjusting, by the external device, a field strength associated with a charging field based on the detected output frequency shift.

The techniques also can be implemented such that the implanted electronic device and the external device are inductively coupled through an electromagnetic field. Further, the techniques can be implemented to include factoring out the shift in the output frequency associated with the non-crystal oscillator that corresponds to one or more of: aging of the implanted electronic device and a change in a rechargeable power source voltage associated with the implanted electronic device. Additionally, the techniques can be implemented to include disabling an output signal from a crystal oscillator included in the implanted electronic device. The techniques also can be implemented such that the output signal is disabled for a predetermined period of time.

In general, in another aspect, the techniques can be implemented to include circuitry configured to provide power to one or more circuit elements included in the implanted electronic device, wherein the one or more circuit elements comprise a non-crystal oscillator; and processor electronics configured to detect a shift in an output frequency associated with the non-crystal oscillator and determine the change in temperature of the implanted electronic device based on the detected output frequency shift.

The techniques also can be implemented to include a transmitter configured to transmit one or more signals based on the output frequency associated with the non-crystal oscillator. The techniques further can be implemented such that at least one of the transmitted signals comprises an unmodulated signal. Additionally, the techniques can be implemented such that one or more of the transmitted signals includes data representing a status of the implanted electronic device.

The techniques also can be implemented to include a receiver, associated with an external device, configured to receive the one or more transmitted signals; and processing electronics, associated with the external device, configured to detect a current output frequency associated with the non-crystal oscillator using at least one of the one or more transmitted signals and to compare the current output frequency with a previous output frequency to determine the shift in the output frequency associated with the non-crystal oscillator. The techniques further can be implemented such that the processing electronics associated with the external device are further configured to convert the current output frequency and the previous output frequency to a voltage measure. Additionally, the techniques can be implemented such that the processing electronics associated with the external device are further configured to adjust a field strength associated with a charging field based on the detected output frequency shift.

The techniques also can be implemented such that the implanted electronic device and the external device are inductively coupled through an electromagnetic field. The techniques further can be implemented such that the processing electronics are further configured to factor out the shift in the output frequency associated with the non-crystal oscillator that corresponds to one or more of: aging of the implanted electronic device and a change in a rechargeable power source voltage associated with the implanted electronic device. Additionally, the techniques can be implemented such that the processing electronics are further configured to disable an output signal from a crystal oscillator included in the implanted electronic device. The techniques also can be implemented such that the processing electronics are further configured to disable the output signal for a predetermined period of time.

The techniques described in this document may be implemented to realize one or more of the following advantages. For example, the techniques can be implemented to permit the safe use of a higher charging field strength and a longer charging interval without concerns over device heating, thereby making device charging operations more efficient. The techniques also can be implemented to reduce the size and expense of a circuit required to implement temperature measurement during device charging operations by eliminating the need for additional components, such as thermistors and analog-to-digital converters. The techniques can further be implemented to reduce the amount of power consumed in order to measure changes in the temperature of a device during a device charging operation. Additionally, the techniques can be implemented to create implantable electronic devices featuring a smaller form factor. The techniques also can be implemented to permit engineers to design circuits without concern over sensor placement. Additionally, the techniques can be implemented such that a non-crystal oscillator included in an implantable electronic device can be selectively activated during device charging operations.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1:
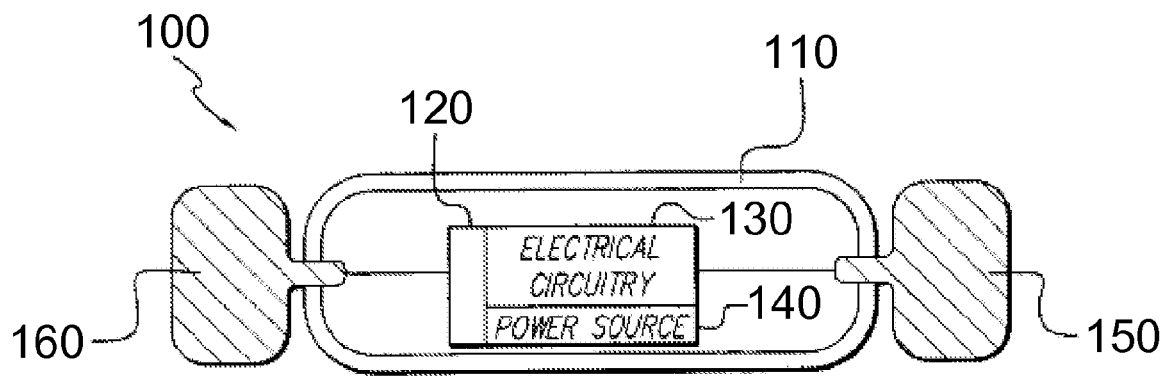
FIG. 1 is a block diagram of an implantable electronic device.

FIG. 1 presents an implantable electronic device, or stimulator 100, that is configured to provide stimulus to surrounding nerves and tissues once implanted in a patient. As described above, the stimulator 100 can stimulate tissue directly or indirectly to elicit a desired response, which can be inhibitory or excitatory. The stimulator 100 also can deliver one or more of, e.g., electrical stimuli, chemical stimuli, thermal stimuli, electromagnetic stimuli, and/or mechanical stimuli in order to elicit a desired response in a variety of settings. For example, the stimulator 100 can stimulate tissue by electrically exciting the depolarization of a nerve and/or muscle tissue. Further, the stimulator 100 can stimulate tissue by delivering chemical stimuli or electromagnetic stimuli, such as light. Additionally, the stimulator 100 can include one or more elements to deliver stimuli to tissue, including, e.g., electrodes, drug delivery elements, heaters, coolers, light sources, fiber optics, and/or mechanical elements such as piezoelectric elements, balloons, Micro-Electro-Mechanical Systems devices, and the like.

Further, the stimulator 100 can comprise an implantable pulse generator (IPG) coupled to a lead of electrodes, a spinal cord stimulator (SCS), a cochlear implant, a deep brain stimulator, a drug pump, a micro-drug pump, microstimulator, or any other type of implantable stimulator configured to deliver electrical and/or chemical stimuli.

Example IPG's include those described in U.S. Pat. Nos. 6,381,496, 6,553,263, and 6,760,626, the contents of all of which are incorporated herein by reference. Example SCS's include those described in U.S. Pat. Nos. 5,501,703, 6,487,446, and 6,516,227, the contents of all of which are incorporated herein by reference. Example cochlear implants include those described in U.S. Pat. Nos. 6,219,580, 6,272,382, and 6,308,101, the contents of all of which are incorporated herein by reference. Example deep brain stimulators include those described in U.S. Pat. Nos. 5,938,688, 6,016,449, and 6,539,263, the contents of all of which are incorporated herein by reference. Example drug pumps include those described in U.S. Pat. Nos. 4,562,751, 4,678,408, 4,685,903, 5,080,653, 5,097,122, 6,740,072, and 6,770,067, the contents of all of which are incorporated herein by reference. Example micro-drug pumps include those described in U.S. Pat. Nos. 5,234,692, 5,234,693, 5,728,396, 6,368,315, 6,666,845, and 6,620,151, the contents of all of which are incorporated herein by reference. Various details associated with the manufacture, operation, and use of implantable microstimulators are described in U.S. Pat. Nos. 5,193,539, 5,193,540, 5,312,439, 6,185,452, 6,164,284, 6,208,894, and 6,051,017, the contents of all of which are incorporated herein by reference.

In an implementation, the stimulator 100 can be enclosed a narrow, elongated housing 110 that includes a programmable memory 120, electrical circuitry 130, and a rechargeable power source 140. The electrical circuitry 130 is connected to electrodes 150 and 160, which can deliver electrical stimulation to surrounding tissues and nerves. The electrodes 150 and 160 can comprise leadless electrodes that pass through the housing 110. Alternatively, the electrodes 150 and 160 can be affixed to leads and thus be positioned away from the housing 110 by a distance suitable for the intended application. The electrodes 150 and 160 generally comprise a stimulating electrode, which is placed in proximity to the nerve or tissue that is to be stimulated, and an indifferent electrode, which completes the circuit and thereby facilitates electrical stimulation.

The external surfaces of the housing 110 can be constructed of one or more biocompatible materials, including glass, ceramic, or other material that provides a hermetic package capable of excluding water vapor and permitting the passage of electromagnetic fields, such as the electromagnetic fields used to transfer power and signals to the stimulator 100. The electrodes 150 and 160 can be comprised of a noble or refractory metal or compound, such as platinum, iridium, tantalum, titanium, titanium nitride, niobium, or similar alloys that will resist corrosion or electrolysis that can damage the stimulator 100 or the surrounding tissues and nerves. In another implementation, the external surfaces of the housing 110 can be constructed of a noble metal or compound, or some combination of a noble metal or compound and one or more biocompatible materials, such as glass or ceramic.

The programmable memory 120 included in the stimulator 100 can be used to store data, such as stimulation parameters and control parameters. The data stored in the programmable memory 120 can be communicated to, or reprogrammed by, an external device through one-way or bi-directional communication. Additionally, the electrical circuitry 130 can be configured to store data in the programmable memory 120 during operation of the stimulator 100.

The electrical circuitry 130 included in the stimulator 100 can include circuitry for receiving power and/or signals transmitted by an external source. In an implementation, the electrical circuitry 130 can include an inductive coil for receiving power from an electromagnetic field, and for receiving and/or transmitting data via one or more electromagnetic fields. Further, the electrical circuitry 130 can include one or more integrated circuits for performing control functions, such as decoding and storing data received from an external source, generating stimulation pulses based on stimulation parameters, and monitoring the state of charge of the rechargeable power source 140. Additionally, the electrical circuitry 130 can further include discrete electronic components used to perform the functions of the stimulator 100, such as capacitors, resistors, transistors, and demodulators. As discussed above, the rechargeable power source 140 can be an electrolytic capacitor or a secondary battery, such as a lithium-ion or a lithium-ion polymer battery. In order to monitor, control, and protect the rechargeable power source 140, the electrical circuitry 130 also can include circuitry for recharging the rechargeable power source 140, such as the charging control circuit described below.

In another implementation, the implantable electronic device can comprise a different type of device that is adapted to the requirements of a different application. For example, the implantable electronic device can comprise a spinal cord stimulator device that is adapted to treat chronic pain. Alternatively, the implantable electronic device can comprise a pacemaker adapted to treat cardiac arrhythmia. Regardless of the intended application, the implantable electronic device implementation can include a type of rechargeable power source and various electrical circuitry for monitoring, controlling, and protecting the rechargeable power source.

Figure 2:
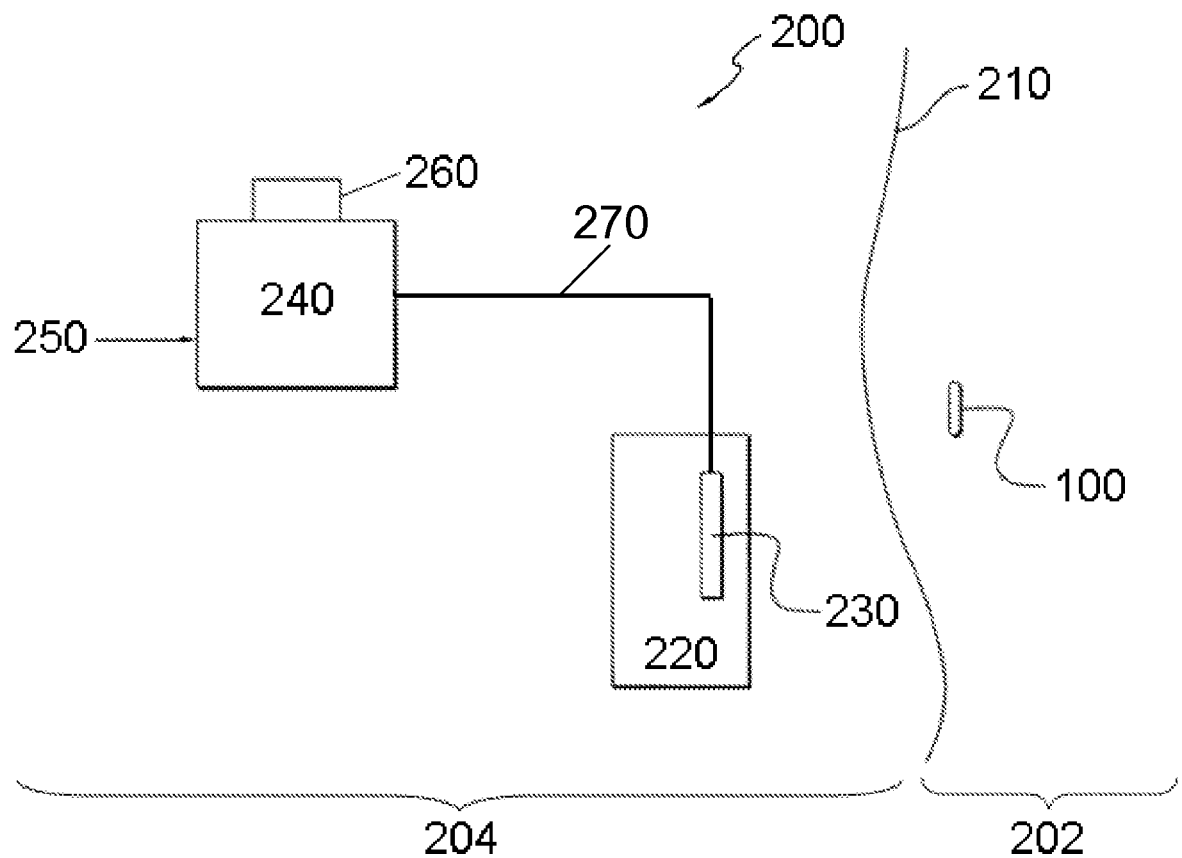
FIGS. 2-3 are functional block diagrams of a stimulation system.

As shown in FIG. 2, the stimulator 100 can comprise a portion of a stimulator system 200 that includes an internal portion 202 and an external portion 204. In the system of FIG. 2, the internal portion 202 lies inside of the body of a patient 210 and is comprised of one or more stimulators, including the stimulator 100. The external portion 204 of the stimulator system 200 comprises a control system that is used to communicate with, and provide power to, the one or more stimulators included in the internal portion 202.

In an implementation, the patient 210 is positioned within the operating range of an external interface 220 when a device charging operation or communication with the stimulator 100 is to be initiated. The external interface 220 can include one or more inductive coils 230 that are used to generate an electromagnetic field. The electromagnetic field can be generated with sufficient strength to penetrate the tissue of the patient 210 beyond the minimum implant depth of the stimulator 100. The stimulator 100 can thereby be inductively coupled with the external interface 220 and thus the external controller 240.

The external controller 240 provides signals and power to the external interface 220 through a cable interface 270. The external interface 220 can also provide signals to the external controller 240 through the cable interface 270. In another implementation, the external interface 220 and the external controller 240 can communicate through a wireless interface (not shown) instead of, or in addition to, the cable interface 270. In such an implementation, the external interface 220 further can include an independent power supply, such as a connection to a conventional power source or a battery.

The external controller 240 also can include a connection to a conventional power source 250, such as an alternating current adapter. Additionally, the external controller 240 can include a control interface 260 that receives input from one or more users, such as a caregiver or a patient. The control interface 260 also can output information relating to the status and the configuration of the stimulator 100 to the one or more users. The control interface 260 can be any control interface or combination of control interfaces known in the art, including a mouse, a keyboard, a keypad, a touch screen, a touch pad, a voice command interface, an electro-mechanical switch, a speaker, and a visual display device.

The external interface 220 can be embedded in a fixed location, such as a charging table, a charging chair, or a similar structure. In another implementation, the external interface 220 can be included in a portable object, such as a charging paddle, a cushion, a pillow, or a similar object. In such an implementation, the external interface 220 can be adapted to be worn by or affixed to the patient 210. For example, the external interface 220 can be worn on a belt, inserted into a pouch in a garment, or affixed to the patient using VELCRO® or an adhesive.

Figure 3:
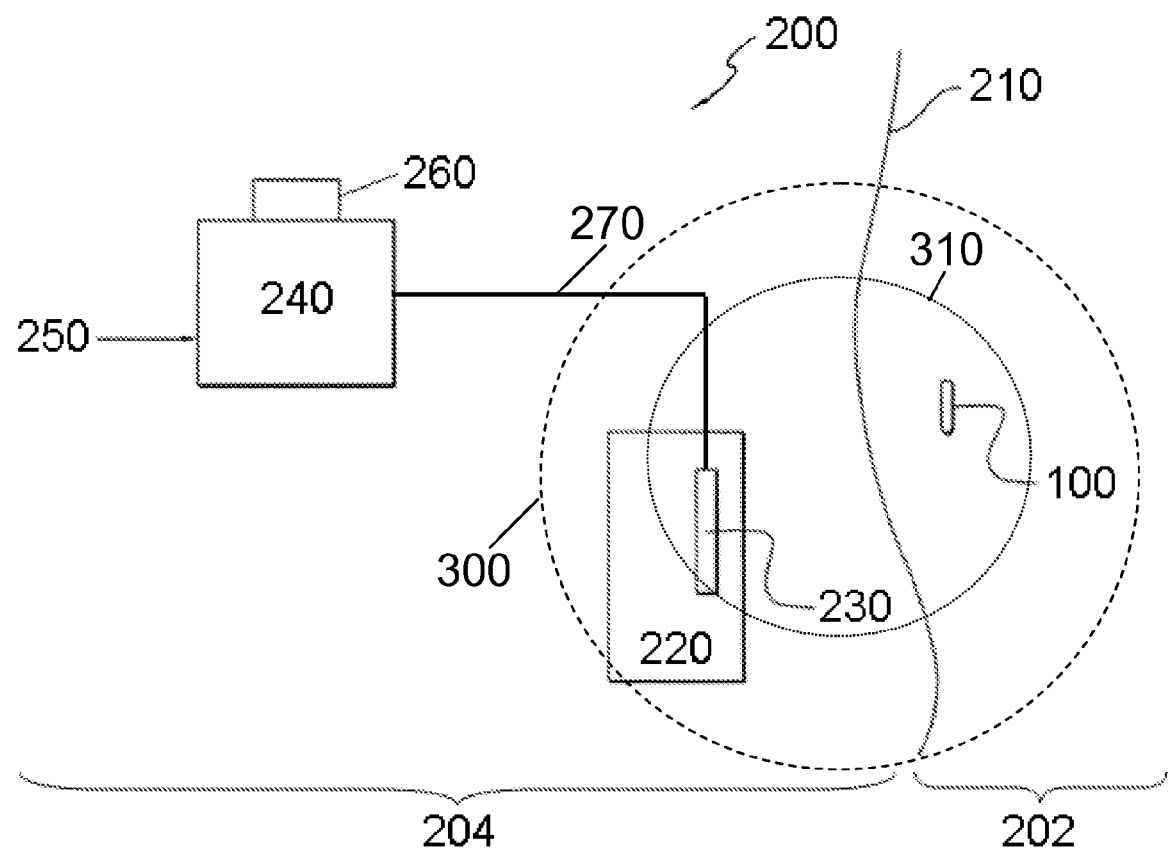

As shown in FIG. 3, the external interface 220 can be inductively coupled to the stimulator 100 through an electromagnetic field 300 generated at the external interface 220. As a result of this inductive coupling, power and signals can be transmitted from the external interface 220 to the stimulator 100. Similarly, the stimulator 100 can be inductively coupled to the external interface 220, and thus to the external controller 240, through an electromagnetic field 310 generated by the stimulator 100. The stimulator 100 can thereby transmit signals to the external interface 220 and the external controller 240. In another implementation, signals can be transmitted between the external interface 220 and the stimulator 100 using a single electromagnetic field, such as the electromagnetic field 300.

Figure 4:
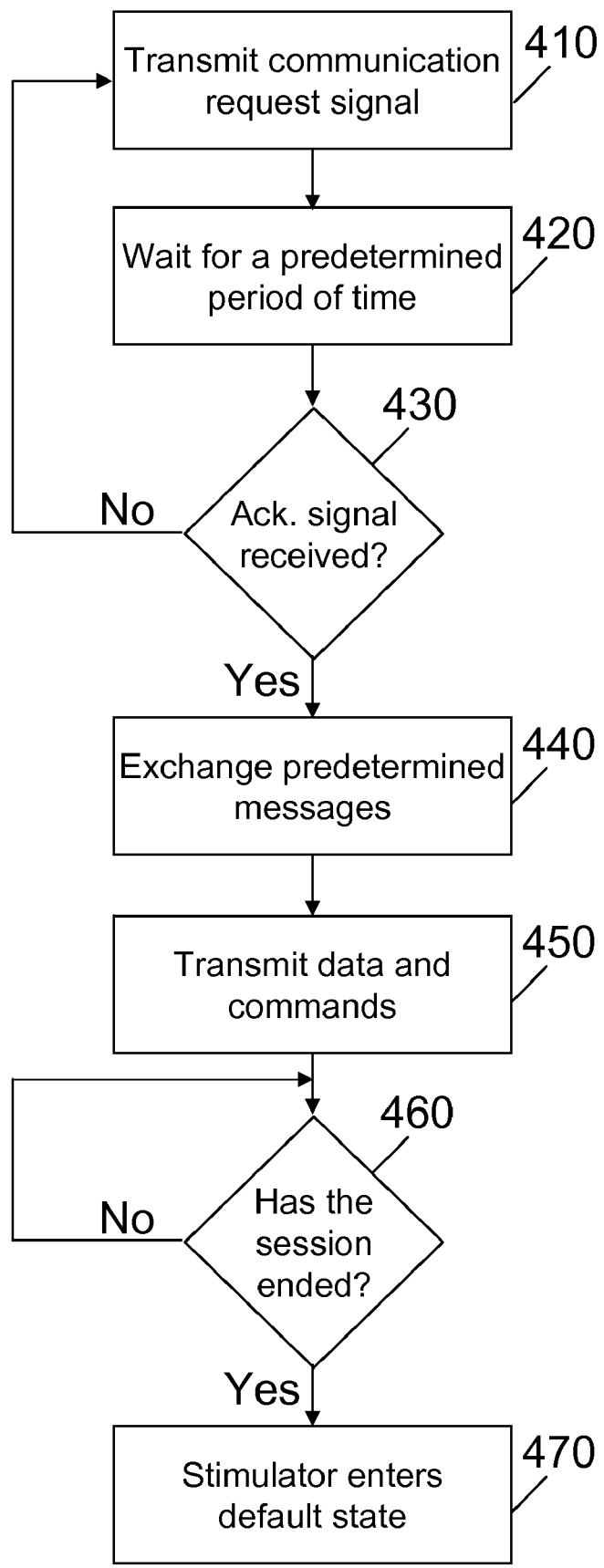
FIG. 4 is a flowchart of a communication process in a stimulation system.

FIG. 4 presents a flowchart describing an implementation of the communication process between the external controller 240 and the stimulator 100. In order to initiate communication with the stimulator 100, the external controller 240 can transmit one or more communication request signals through the external interface 220 in a first step 410.

The stimulator 100 must expend power to monitor for the receipt of a communication request signal. Therefore, the stimulator 100 can be configured to periodically open a listen window for a short duration. For example, the stimulator 100 can be configured to open a 13 millisecond listen window every 1.5 seconds. Because the stimulator 100 does not have a listen window open at all times, the external controller 240 may be required to transmit more than one communication request signal before such signal is successfully received by the stimulator 100. In a second step 420, the external controller 240 stops generating the electromagnetic field after transmitting a communication request signal and waits for a predetermined period of time to receive an acknowledgement signal from the stimulator 100. Upon receiving a communication request signal, the stimulator 100 can wait for a predetermined period of time and then transmit an acknowledgement signal to indicate that the communication request signal has been received. In a third step 430, the external controller 240 determines whether an acknowledgement signal from the stimulator 100 has been received. If no acknowledgement signal has been received, the external controller 240 returns to the first step 410 and transmits one or more additional communication request signals.

Because the frequencies at which the stimulator 100 communicates may change, such as in response to a charging operation, the external controller 240 can implement an iterative approach, such as a frequency hopping operation, in order to establish communication with the stimulator 100. For example, the external controller 240 can transmit one or more communication request signals at a first frequency that corresponds to a frequency at which the stimulator 100 is expected to communicate. If, after a predetermined period of time, communication cannot be established with the stimulator 100 at the first frequency, the external controller 240 can transmit one or more additional communication request signals at a second frequency. In this manner, the external controller 240 can continue to transmit communication request signals to the stimulator 100 at different frequencies until communication is established. Once communication has been established, the communication frequency can be stored by the external controller 240 as a starting frequency. The next time the external controller 240 attempts to establish communication with the stimulator 100, the external controller 240 can select the starting frequency as the frequency at which the initial communication request signals are transmitted.

The stimulator 100 can be configured to use the output frequency of an oscillator included in the electrical circuitry 130 as the center frequency for transmissions. In an implementation, the stimulator 100 transmits on a center frequency that is approximately 127 kHz using frequency shift keying. The stimulator 100 represents a digital 0 by transmitting at a frequency $f_O$ for a predetermined period, where $f_o$ is, for example, 4 kHz less than the center frequency. Similarly, the stimulator 100 represents a digital 1 by transmitting at a frequency $f_1$ for a predetermined period, where $f_1$ is, for example, 4 kHz greater than the center frequency. The stimulator 100 can thus transmit an acknowledgement signal using either or both of these frequencies. For example, the stimulator 100 can transmit an acknowledgement signal comprising an unmodulated signal at frequency $f_O$ for a predetermined period of time. In another implementation, the stimulator 100 can be configured to transmit at one or more different frequencies using a different protocol, such as phase shift keying.

After communication has been established between the external controller 240 and the stimulator 100, predetermined messages can be exchanged in a fourth step 440. For example, the stimulator 100 can transmit one or more messages describing the status of the stimulator 100, including a current voltage of the rechargeable power source 140, stimulation parameters, and other device settings. In a fifth step 450, the external controller 240 can transmit additional data and commands to the stimulator 100. For example, the external controller 240 can reprogram the stimulator 100 by providing new configuration data, such as one or more stimulation parameters.

In a sixth step 460, the stimulator 100 determines whether a predetermined period of time has passed since the last communication was received from the external controller 240. If a predetermined period of time has elapsed without additional communication from the external controller 240, the stimulator 100 determines that the communication session has ended and returns to a default state in a seventh step 470, in which the stimulator 100 periodically opens a listen window for a short period of time. In order to reestablish communications with the stimulator 100 once it has returned to its default state, the external control 240 must once again execute the first step 410.

Figure 5:
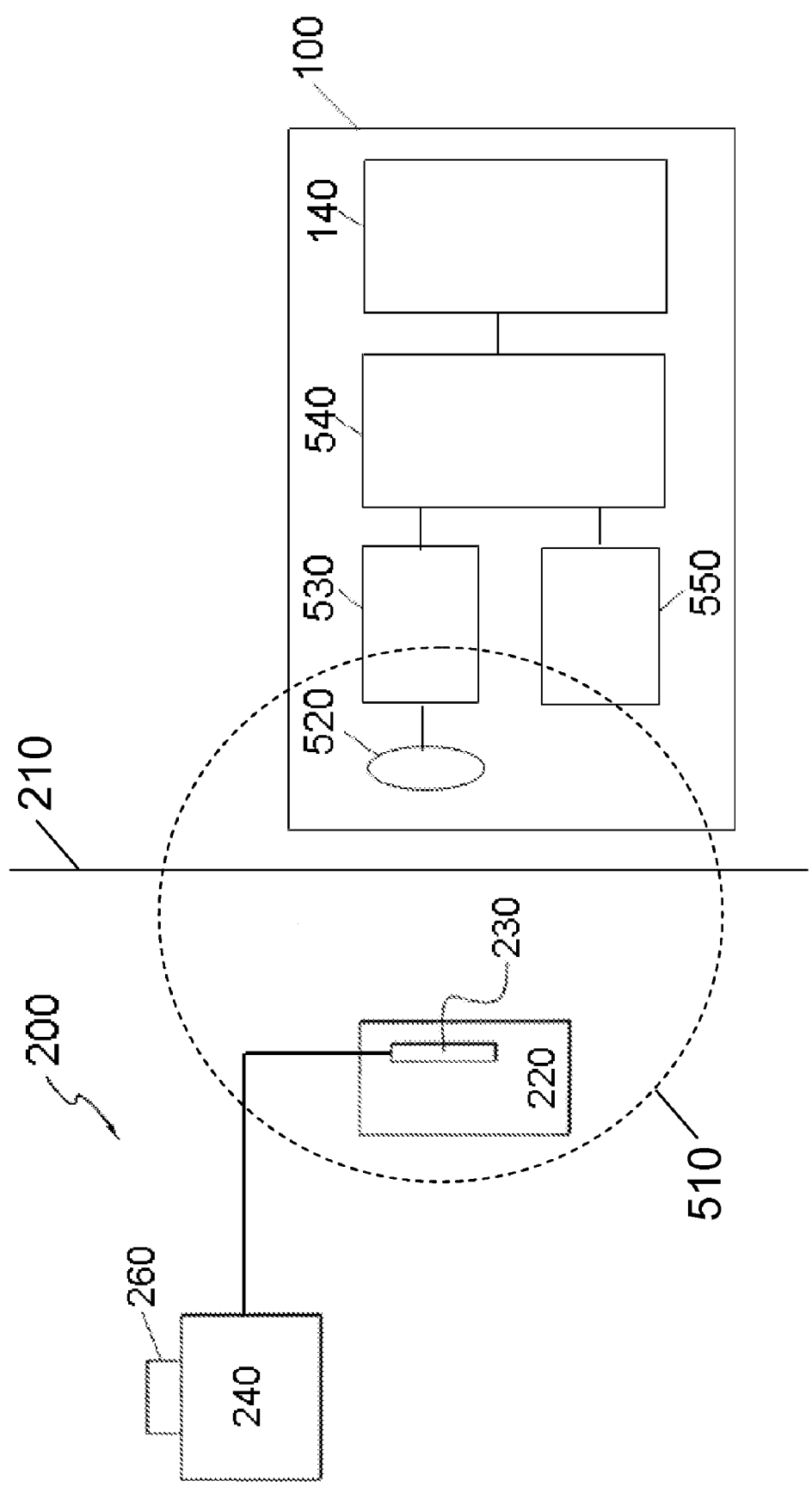
FIG. 5 is a block diagram of a charging system.

An implementation of a device charging system included in the stimulator system 200 is shown in FIG. 5. As discussed above, the stimulator 100 is implanted beneath the skin of the patient 210. The rechargeable power source 140 contained in the stimulator 100 must be recharged periodically, so that the stimulator 100 can continue to operate as intended. During a device charging operation, the external controller 240 generates a charging field 510, such as an electromagnetic field, by supplying power to the one or more inductive coils 230 included in the external interface 220. In another implementation, the external controller 240 can signal the external interface 220 to generate the charging field 510 and the external interface 220 can draw power from an independent power source, such as an alternating current adapter or battery.

The external interface 220 is placed in proximity to the stimulator 100 that is implanted in the patient 210. Once the external interface 220 and the stimulator 100 are inductively coupled through the charging field 510, an alternating current appears across the inductive coil 520 included in the stimulator 100. The alternating current appearing across the inductive coil 520 can be converted to direct current by an alternating-current to direct-current converter 530. The direct-current is then used to charge the rechargeable power source 140, which in turn provides power to the electrical circuitry 130 (not shown) in the stimulator 100.

The stimulator 100 also can include a charging control circuit 540 that delivers a constant charging current to the rechargeable power source 140. The charging control circuit 540 can include circuitry to ensure that the rechargeable power source 140 is charged at the proper rate and is not overcharged, such a field effect transistor switch. Further, the charging control circuit 540 can include a fuse to ensure that the rechargeable power source 140 is not charged with too much current and to protect the rechargeable power source 140 in the event of a short circuit. When the charging control circuit 540 detects that the rechargeable power source 140 has reached the target voltage level, the charging control circuit 540 maintains the rechargeable power source 140 at a constant voltage and directs any additional charging current to a charging protection circuit 550. Moreover, if the charging field 510 exceeds the strength required to provide the charging control circuit 540 with sufficient current to charge the rechargeable power source 140, the charging control circuit 540 directs the additional current to the charging protection circuit 550.

The charging protection circuit 550 is primarily designed to serve as a resistive circuit that dissipates excess current as heat. Therefore, if the external controller 240 generates a charging field 510 that is too strong, or if the strength of the charging field 510 increases due to a change in the alignment of the stimulator 100 and the external interface 220, the temperature of the stimulator 100 can increase significantly. As such, it is difficult to optimize the strength of the charging field 510 unless the temperature of the stimulator 100 can be determined during the device charging operation.

In another implementation, as discussed above, the housing 110 of the stimulator 100 can be comprised, in whole or in part, of a noble metal or alloy. In such an implementation, the housing 110 can be subject to eddy currents that can contribute to the increase in temperature of a stimulator during communication or device charging operations.

Figure 6:
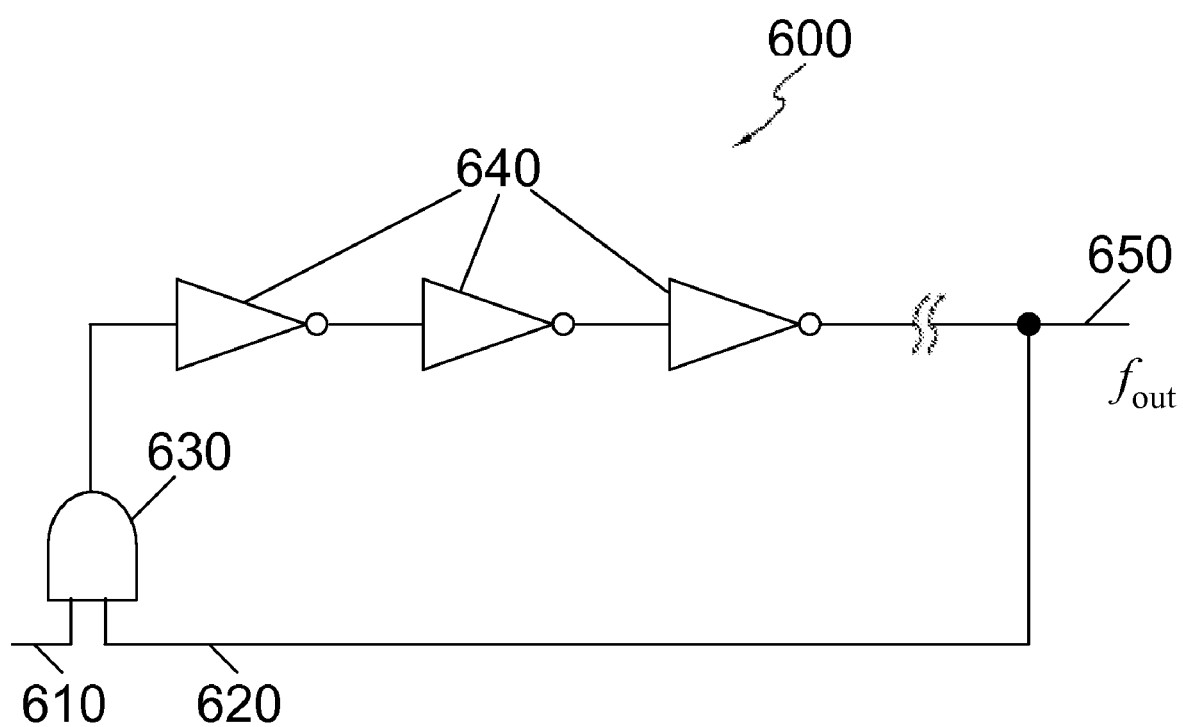
FIG. 6 is a block diagram of a non-crystal oscillator.

The electrical circuitry 130 of the stimulator 100 also can include a non-crystal oscillator, such as a ring-oscillator or a resistor-capacitor oscillator. FIG. 6 presents an implementation of a ring-oscillator 600 that can be used to provide an output frequency signal $f_{out}$ to the stimulator 100. Various configurations of the ring-oscillator 600 can be implemented using discrete circuit elements included in the electrical circuitry 130 of the stimulator 100. The ring-oscillator 600 includes an enable line 610 and a feedback line 620 that serve as inputs to the AND gate 630. The ring-oscillator 600 also includes an odd number of inverters 640, which cause the oscillation. The signal output from the inverters 640 is directed back to the AND gate 630 on the feedback line 620 and is provided as an output frequency signal $f_{out}$ on the output line 650.

In another implementation, the stimulator 100 can include a crystal oscillator that provides an output frequency signal to the stimulator 100 during normal operation and a non-crystal oscillator, such as the ring-oscillator 600, that provides an output frequency signal to the stimulator 100 during at least a portion of the device charging operation. The ring-oscillator 600 can be disabled during normal operation. During a device charging operation, however, the crystal oscillator can be disabled and the ring-oscillator 600 can be enabled by providing an enable signal to the AND gate 630 on the enable line 610. The enable signal can be provided to the AND gate 630 for a predetermined period of time. Alternatively, the enable signal can be provided to the AND gate 630 until the external controller 240 commands the stimulator 100 to disable the ring-oscillator 600.

A non-crystal oscillator, such as the ring-oscillator 600, is used to provide the output frequency signal $f_{out}$ during device charging operations because non-crystal oscillators are subject to frequency shift under a number of circumstances. By determining the frequency shift associated with a non-crystal oscillator, it is possible to determine the change in the temperature of an implanted electronic device during a device charging operation. For example, an increase in the rechargeable power source voltage is known to produce a frequency shift of approximately 0.8% per volt, which equates to approximately 1 kHz per volt in a system with a center frequency of 127 kHz. Further, a change in the temperature of a device is known to produce a frequency shift of approximately 0.1% per degree Celsius, which equates to approximately 127 Hz per degree Celsius. Finally, an increase in the age of an integrated circuit is known to produce a frequency shift of approximately 1.0% per year.

Because it is possible to determine the age of the electrical circuitry 130 in the stimulator 100, it is also possible to factor out the frequency shift produced as a result of circuit aging from the total detected frequency shift. In another implementation, the small amount of frequency shift attributable to circuit aging can simply be disregarded. Similarly, because the present voltage of the rechargeable power source 140 can be determined during a device charging operation, it is also possible to factor out the frequency shift produced as a result of the rechargeable power source voltage from the total detected frequency shift.

After the components of frequency shift attributable to circuit aging and rechargeable power source voltage have been factored out, the remaining frequency shift can be attributed to the change in the temperature of the stimulator 100 during the device charging operation. It has been experimentally determined that approximately 370-380 Hz of frequency shift resulting from a change in the temperature corresponds to a change in the temperature of approximately 3 degrees Celsius. As such, the frequency shift attributable to a change in the temperature can be measured periodically during a device charging operation to ensure that the temperature of stimulator 100 remains within an acceptable range.

Figure 7:
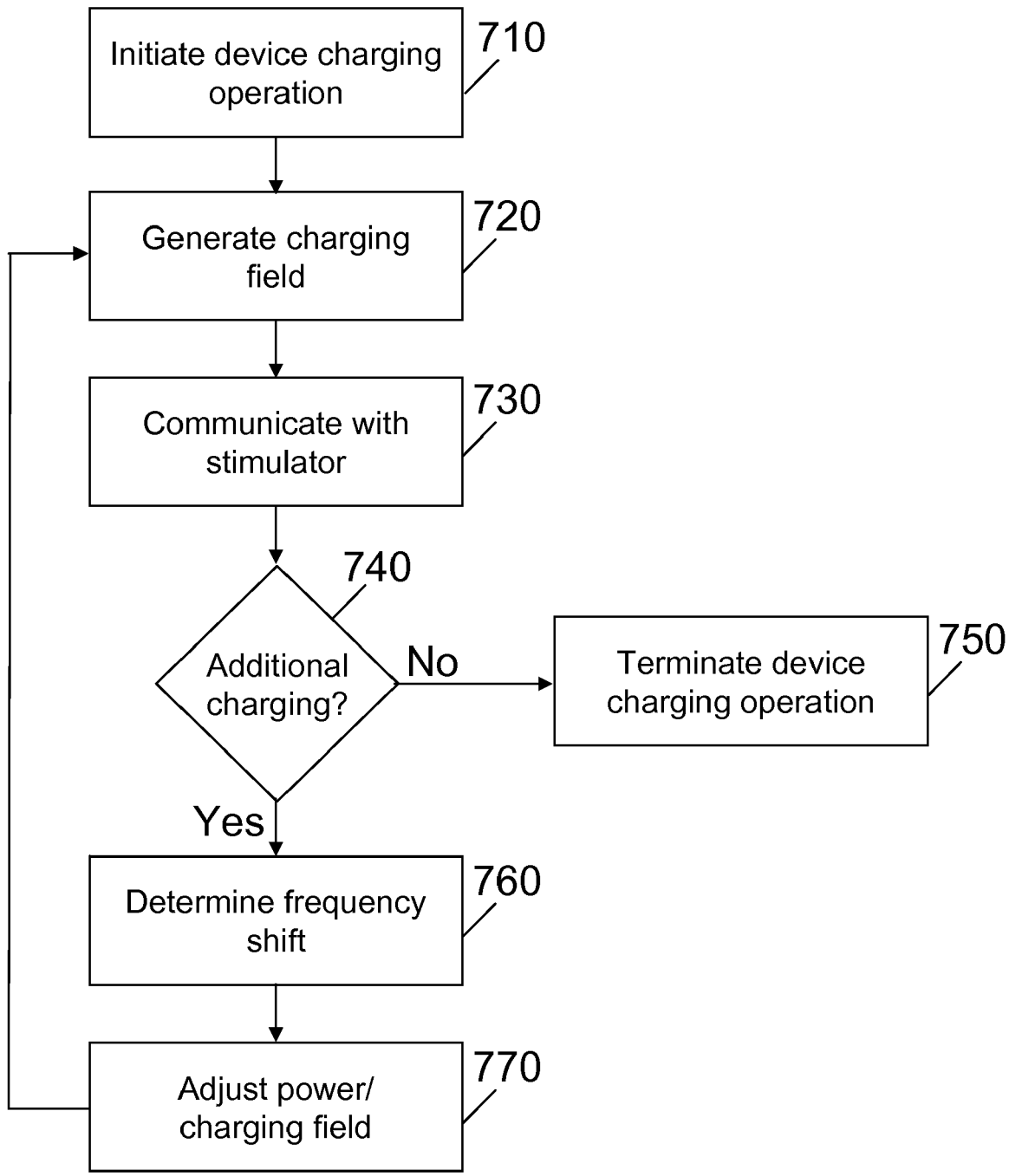
FIG. 7 is a flowchart of a device charging operation.

FIG. 7 presents a flowchart describing a device charging operation during which frequency shift is considered. In a first step 710, the external controller 240 initiates a device charging operation by establishing communication with the stimulator 100. As described above, the frequencies at which the stimulator 100 communicates may change. Therefore, the external controller 240 can implement an iterative process, such as a frequency hopping operation, in order to establish communication with the stimulator 100. Once communication has been established, the communication frequency can be stored as a starting frequency by the external controller 240. The next time the external controller 240 attempts to establish communication with the stimulator 100, the external controller 240 can select the starting frequency as the frequency at which one or more initial communication request signals are transmitted.

In another implementation, the external controller 240 can be calibrated before establishing communication with the stimulator 100. For example, if the external controller 240 expects to receive signals from the stimulator 100 at specific frequencies, such as $f_0$ equal to 123 kHz and $f_1$ equal to 131 kHz, a receiver in the external controller 240 can be tuned to those frequencies.

As described above, the stimulator 100 transmits an acknowledgement signal as part of the communication process, wherein the acknowledgement signal can be based on the center frequency $f_{out}$ output from the non-crystal oscillator included in the stimulator 100, such as the ring-oscillator 600. For example, the stimulator 100 can transmit an unmodulated acknowledgement signal at the frequency $f_O$ for a period of 6 milliseconds. The external controller 240 can detect the frequency of the acknowledgement signal, such as by measuring the pulse-width, determining the time interval between successive rising edges, or counting the number of pulses received within a specific time period. The external controller can then convert the detected frequency to a voltage measure representing the initial frequency of the stimulator 100 and store the initial voltage measure. In another implementation, the external controller 240 can store the detected frequency as a frequency value.

Further, the stimulator 100 can transmit one or more parameters to the external controller 240 for use during the device charging operation, such as an initial voltage of the rechargeable power source 140 and configuration information. The external controller 240 also can transmit commands and information to the stimulator 100, such as reprogramming information. Once the initial communication process is complete, the external controller 240 generates a charging field through the external interface 220 in a second step 720. The charging field is maintained for a predetermined charging interval, which can be selected with respect to efficiency and patient safety. For example, a two minute charging interval can be selected where the charging field strength is such that the maximum temperature increase of the device undergoing charging over that interval is 3 degrees Celsius.

The external controller 240 can then reestablish communication with the stimulator 100 at the end of the charging interval in a third step 730. As described above, the stimulator 100 transmits an acknowledgement signal as part of the communication process. The external controller 240 can once again detect the frequency of the acknowledgement signal, convert the detected frequency to a voltage measure representing the present frequency of the stimulator 100, and store the present voltage measure. In another implementation, the frequency of the acknowledgement signal can be stored as a frequency value.

The stimulator 100 also transmits parameters describing the status of the stimulator 100 to the external controller 240, including the present voltage of the rechargeable power source 140 and the present voltage of a charging node included in the stimulator 100. The external controller 240 then uses the present voltage of the rechargeable power source 140 to determine whether additional charging is required in a fourth step 740. If the rechargeable power source 140 has reached the target voltage, the device charging operation is terminated in a fifth step 750.

If additional charging is required, the external controller 240 compares the present voltage measure with the initial voltage measure to determine the change in voltage in a sixth step 760. The change in voltage is then resolved and converted to Hz to determine the total frequency shift that has occurred during the device charging operation. Additionally, the present voltage of the rechargeable power source 140 is used to determine the frequency shift attributable to the rechargeable power source 140 voltage, which is then factored out of the total frequency shift. As discussed above, the frequency shift due to circuit aging also can be determined and factored out of the total frequency shift. The external controller 240 then determines the change in the temperature of the stimulator 100 based on the adjusted frequency shift. In another implementation, wherein the acknowledgement signal frequencies are stored as frequency values, the total frequency shift that has occurred during the device charging operation can be determined by comparing the frequencies directly.

If necessary, the charging field generated by the external controller 240 can be adjusted in response to determined change in temperature in a seventh step 770. For example, the safety threshold for a particular stimulator may correspond to an adjusted frequency shift of 370-380 Hz. If the adjusted frequency shift is approaching or exceeding the safety threshold, the external controller 240 can suspend additional charging for a predetermined period of time or until the adjusted frequency shift decreases to a safer level. If the adjusted frequency shift falls within a moderate range, the external controller 240 can examine the present voltage of the charging node to determine the field strength received by the stimulator 100 during the previous charging interval. Based on the field strength received by the stimulator 100, the external controller 240 can determine whether the amount of power being supplied to the one or more inductive coils 230 in the external interface 220 should be decreased during the subsequent charging interval. Similarly, if the adjusted frequency shift falls within a low range, the external controller 240 can determine the field strength received by the stimulator 100 during the previous charging interval. Based on the field strength received by the stimulator 100, the external controller 240 can determine whether the amount of power being supplied to the one or more inductive coils 230 in the external interface 220 should be increased during the subsequent charging interval. Once the external controller 240 has adjusted the charging parameters, the device charging operation returns to the second step 720 and a new charging field is generated.

Figure 8:
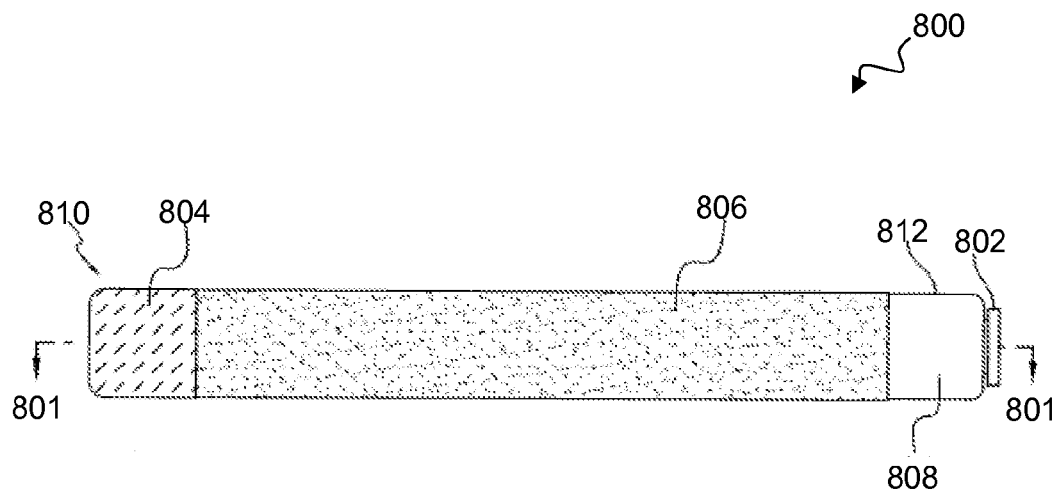
FIGS. 8-10 are block diagrams of an implantable electronic device.
Figure 9:
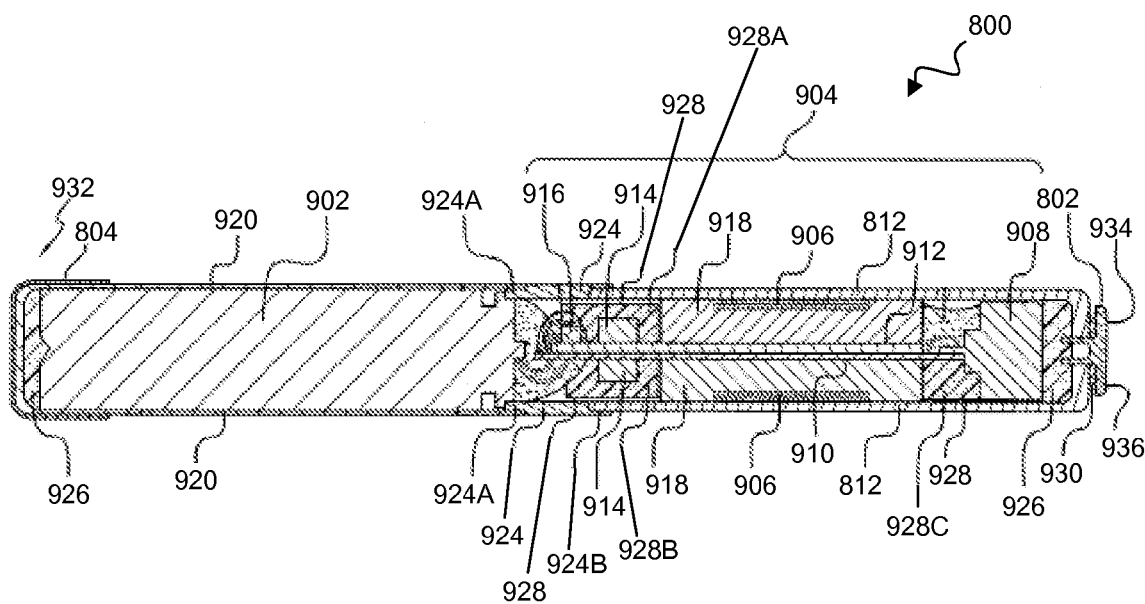
Figure 10:
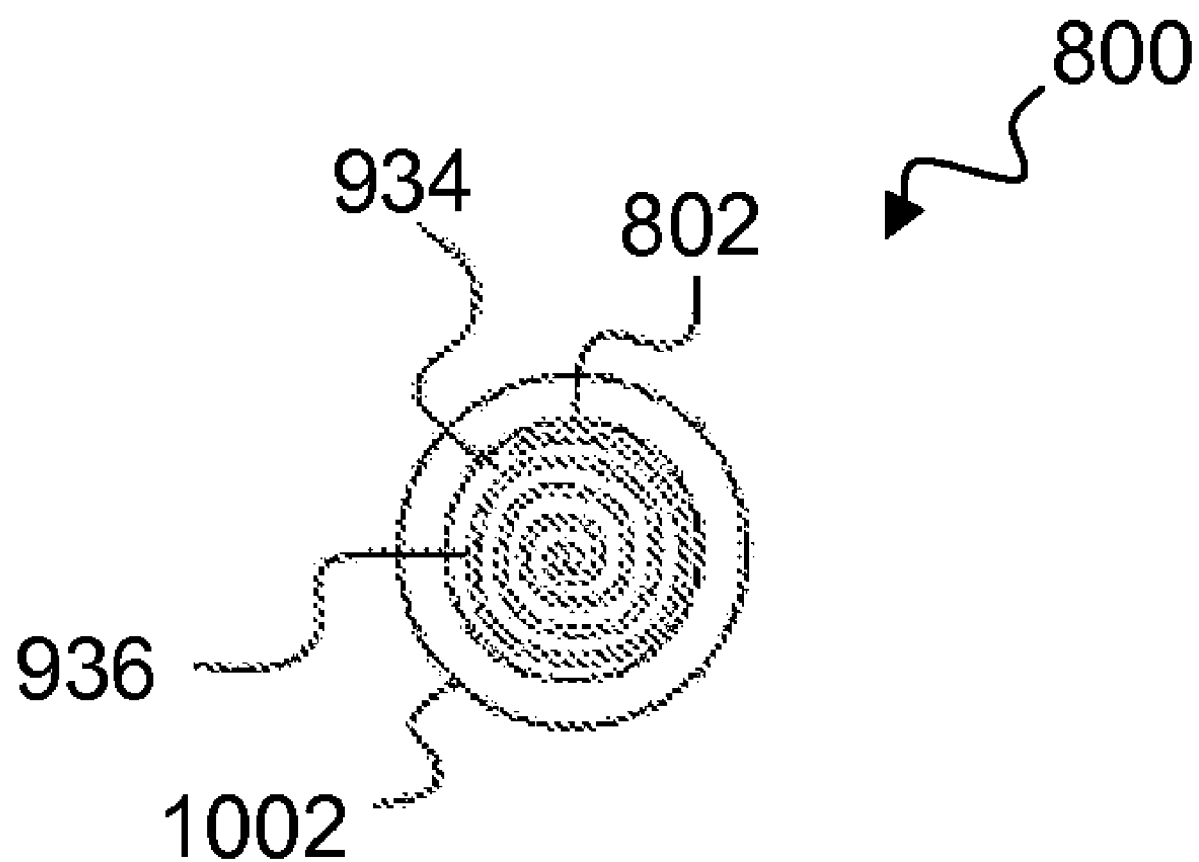

FIGS. 8, 9, and 10 present another implementation of the internal portion 202 of the stimulator system 200. In particular, FIG. 8 shows a side view of a stimulator 800, FIG. 9 shows a sectional view of the stimulator 800 along the line 801-801 in FIG. 8, and FIG. 10 shows an end view of the stimulator 800.

The stimulator 800 includes a pair of electrodes 802 and 804, a power source 902, an electronic subassembly 904, and a case 1002. The button electrode 802 is an active/stimulating electrode whereas electrode 804 is an indifferent/reference electrode. The pair of electrodes 802 and 804 can be made from any of the materials discussed above.

The power source 902 provides power for the delivery of electrical stimuli to tissue through the pair of electrodes 802 and 804. In an implementation, the power source 902 can be a rechargeable power source, such as a rechargeable battery, a capacitor, or the like. When the power source 902 is a rechargeable battery, it can be a lithium-ion battery or other suitable type of battery that can be recharged through the use of a charging field 510 (FIG. 5) or other form of power transfer. One type of rechargeable battery that can be used is disclosed in International Publication WO 01/82398 A1, published 1 Nov. 2001, and/or WO 03/005465 A1, published 16 Jan. 2003, the contents of both of which are incorporated herein by reference. Other battery construction techniques that can be used to make the power source 902 include those shown, e.g., in U.S. Pat. Nos. 6,280,873; 6,458,171, and U.S. Publications 2001/0046625 A1 and U.S. 2001/0053476 A1, the contents of all of which are also incorporated herein by reference. Recharging can be performed using an external charger in the manner described above.

The electronic subassembly 904 includes a coil 906 and a stimulating capacitor 908. The button electrode 802 is coupled to the electronic subassembly 904 through the stimulating capacitor 908. The coil 906 can receive power for charging the power source 902 using power received from the charging field 510 (FIG. 5).

The electronic subassembly 904 also can comprise circuitry for stimulation, telemetry, production testing, behavioral control, and battery charging, including a non-crystal oscillator. The stimulation circuitry can be further divided into components for high voltage generation, stimulation phase current control, recovery phase current control, charge balance control, and over voltage protection circuitry. The telemetry circuitry can be further divided into an on-off keying (OOK) receiver, a frequency shift keying (FSK) receiver, and an FSK transmitter. The behavioral control circuitry can be further divided into components for stimulation timing, high voltage generation closed loop control, telemetry packet handling, and battery management. In addition to these functions, there is circuitry for reference voltage and reference current generation, system clock generation, and Power-On Reset (POR) generation.

In operation, charging circuitry within the electronic subassembly 904 can detect the presence of an external charging field, such as the charging field 510 (FIG. 5). Upon detection, the stimulator 800 can receive a telemetry message and recharge the power source 902, as necessary. As described above, the electronic subassembly 904 can measure a voltage during recharging and transmit the measured voltage value to an external device, such as the external interface 220 (FIG. 2). Battery voltage measurements can be made at times when stimulation pulses are not being delivered. U.S. Pat. No. 6,553,263, incorporated herein by reference, describes charging technology that also can be used.

As another example, when the power source 902 used within the stimulator 800 is a capacitor used in combination with a primary battery and/or a rechargeable battery, the electronic subassembly 904 can use the charge stored on the capacitor to power the stimulator 800 during times of peak power demand. Such times include times when telemetry signals are being transmitted from the stimulator 800 to one or more external device(s), or when the amplitude of the stimulation pulses has been programmed to be relatively high. When used in combination with a rechargeable battery, the electronic subassembly 904 can use the charge stored on the capacitor to recharge the rechargeable battery or to power the stimulator 800 at times of high power demand.

The electronic subassembly 904 also can include protection circuitry to act as a failsafe against battery over-voltage. A battery protection circuit can continuously monitor a battery's voltage and electrically disconnect the battery if its voltage exceeds a preset value. Further, the electronic subassembly 904 can include a memory and a processor and/or other electronic circuitry that allow it to generate stimulating pulses that are applied to a patient through the pair of electrodes 802 and 804 in accordance with logic located within the electronic subassembly 904. The processor and/or other electronic circuitry also can control data communication with an external device, such as the external interface 220 (FIG. 2). The processor and/or other electronic circuitry can allow the stimulator 800 to perform processes described above.

The electronic subassembly 904 also can include a panel 910, integrated circuitry 912, capacitors 914, diodes 916, and two ferrite halves 918. The arrangement of these components in electronic subassembly 904 is described in U.S. Patent Publication No. 2005/0021108, the contents of which is incorporated herein by reference.

The stimulator 800 can have a case 1002 characterized by a tubular or cylindrical shape with an outer diameter greater than about 3.20 mm and less than about 3.70 mm. For example, the case 1002 can have an outer diameter of about 3.30 mm. Additionally, the case 1002 can have an inner diameter that encloses the electronic subassembly 904 and is greater than about 2.40 mm and less than about 2.54 mm. The case 1002 also can have an inner diameter that encloses the power source 902 and is greater than about 2.92 mm and less than about 3.05 mm. The length of the case 1002 can be less than about 30.00 mm, and greater than about 27.00 mm. The portion of the case 1002 that encloses the electronic subassembly 904 can be less than about 13.00 mm in length and the portion of the case 1002 that encloses the power source 902 can be about 11.84 mm in length. These dimensions are only examples and can be changed to accommodate different types of power sources. For example, the stimulator 800 can have a rectangular or ovoid cross section instead of being cylindrically shaped. Additionally, the case 1002 can be Magnetic Resonance Imaging (MRI) compatible.

The case 1002 can be sealed to protect the electrical components contained within the stimulator 800. For example, the case 1002 can be hermetically-sealed and made from two cylindrical cases, namely, a titanium 6/4 case 920 and a zirconia ceramic case 812. Other materials and shapes for the case 1002 also can be used. A titanium 6/4 or other suitable connector 924 can be brazed with a titanium nickel alloy (or other suitable material) to ceramic case 812 for securing the mating end of titanium case 920. A connector 924 has an inside flange 924A and an outside flange 924B which serve to "self center" the braze assembly. Before inserting the subassembly and before securing the mating ends, conductive silicone adhesive 926 can be applied to the inside end of the ceramic shell as well as to the inside end of the titanium shell. A molecular sieve moisture getter material 928 is also added to areas 928A, 928B, and 928C (FIG. 9) before the brazing process.

The "spiral" self centering button electrode 802 can be made from titanium 6/4 or other suitable material and plated with an iridium coating or other suitable conductive coating. An end view of the button electrode 802 is shown in FIG. 10. A spiral groove 936 can be made in stimulating surface 934 of the button electrode 802. Other groove shapes, such as a cross hatch pattern or other patterns can also be used to increase the area of the stimulating surface 934 of the button electrode 802.

The sharp edges in groove 936 can force a more homogeneous current distribution over the stimulating surface 934 and decrease the likelihood of electrode corrosion over time by reducing current density along the sharp groove edges. A tool made in the shape of a trapezoid or similar shape can be used to cut the groove 936 into a spiral or other shape. Other devices for cutting the groove 936 can be used such as, e.g., ion beam etching.

The button electrode 802 can act as active or stimulating electrode. A titanium/nickel alloy 930 or other suitable material can be used to braze the button electrode 802 to the zirconia ceramic case 812. An end view of the stimulator 800 is shown in FIG. 10, where the end view of the stimulating "spiral" button electrode 802 can be seen. The end 932 of the titanium shell 920 can be plated with an iridium coating (other suitable conductive coating can be applied), which plated area becomes the indifferent iridium electrode 804.

FIG. 8 shows a top view of the stimulator 800 with the external coatings depicted. A type C parylene or other suitable electrically insulating coating can be applied to the shaded area 806, e.g., by standard masking and vapor deposition processes. The zirconia ceramic case 812 is left exposed in area 808 and the iridium electrode 804 is shown on the end 810 of the titanium case 920.

U.S. Pat. No. 6,582,441, incorporated herein by reference, describes a surgical insertion tool which can be used for implanting the stimulator 800. The procedures taught in the '441 patent for using the tool and associated components can be used for implanting and extracting the stimulator 800. The surgical insertion tool described in the '441 patent facilitates the implantation of the stimulator 800 in a patient so that the button electrode 802 is proximate to a nerve site (e.g., near the pudendal nerve for treating patients with urinary urge incontinence). The distance between the button electrode 802 and the nerve site can be, for example, less than 1-2 mm.

Other implantation procedures exist relating to the specific area to be stimulated. The stimulator 800 also can be implanted in other nerve sites relating to preventing and/or treating various disorders associated with, e.g., prolonged inactivity, confinement, or immobilization of one or more muscles and/or as therapy for various purposes including paralyzed muscles and limbs, by providing stimulation of one or more cavernous nerves for an effective therapy for erectile or other sexual dysfunctions, and/or by treating other disorders, e.g., neurological disorders caused by injury or stroke.

Figure 11:
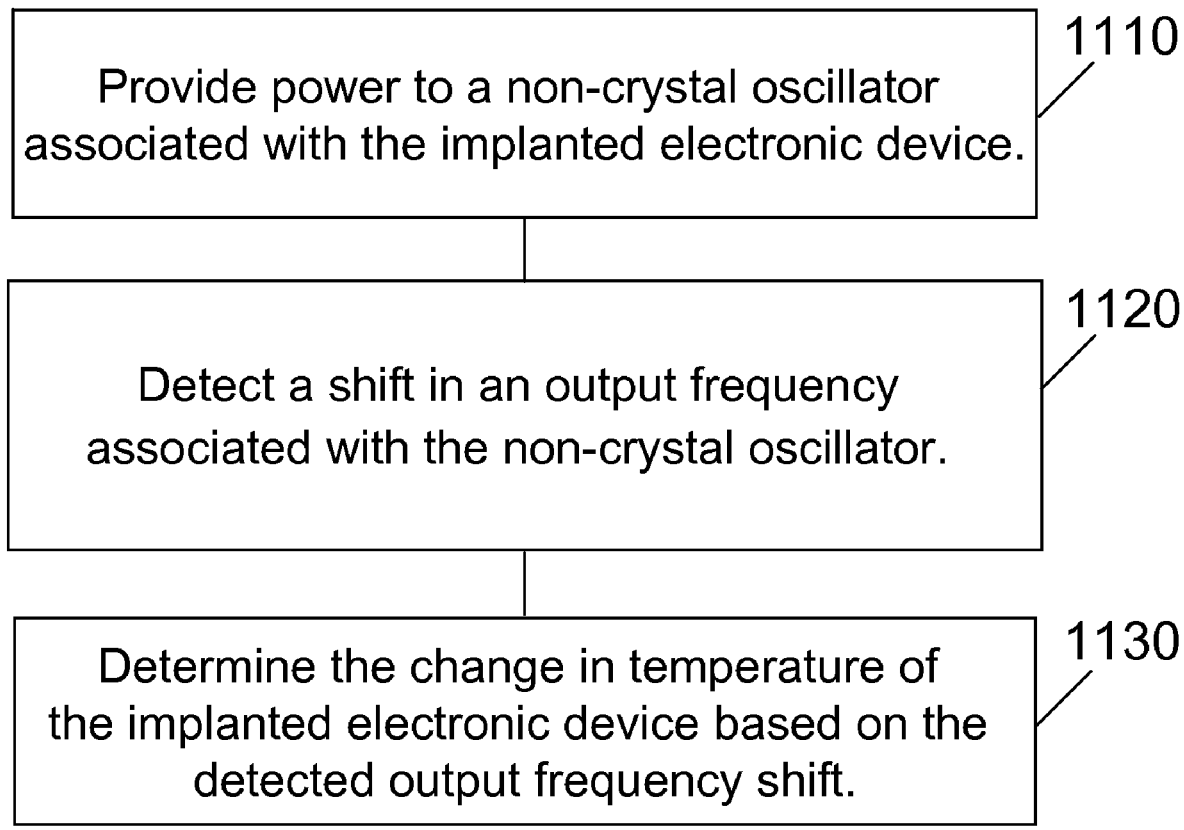
FIG. 11 is a flowchart of a method of determining the change in temperature of an implantable electronic device.

FIG. 11 describes a method of determining a change in temperature of an implanted electronic device. In a first step 1110, power is provided to a non-crystal oscillator associated with the implanted electronic device. In a second step 1120, a shift in an output frequency associated with the non-crystal oscillator is detected. Once the shift in the output frequency associated with the non-crystal oscillator has been detected, the third step 1130 is to determine the change in temperature of the implanted electronic device based on the detected output frequency shift.

A number of implementations have been disclosed herein. Nevertheless, it will be understood that various modifications may be made without departing from the spirit and scope of the claims. Accordingly, other implementations are within the scope of the following claims.

What is claimed is:

1. A method comprising:
   receiving a signal transmitted by an implantable electronic device, wherein a transmission frequency of the received signal corresponds to an output frequency associated with a non-crystal oscillator included in the implantable electronic device;
   comparing the transmission frequency of the received signal with an initial value to detect a frequency shift; and
   determining a change in temperature of the implantable electronic device based on the detected frequency shift.

2. The method of claim 1, wherein the received signal comprises an unmodulated signal.

3. The method of claim 1, wherein the initial value comprises a transmission frequency of a signal transmitted by the implantable electronic device prior to a charging operation.

4. The method of claim 1, wherein the received signal comprises a modulated signal including data representing a status of the implantable electronic device.

5. The method of claim 4, further comprising:
   determining a voltage change of a rechargeable power source included in the implantable electronic device based on the data representing the status of the implantable electronic device; and
   factoring out of the detected frequency shift a component corresponding to the voltage change.

6. The method of claim 1, further comprising:
   factoring out of the detected frequency shift a component corresponding to aging of the implantable electronic device.

7. The method of claim 1, further comprising:
   adjusting a charging field based on the determined change in temperature.

8. The method of claim 1, further comprising:
   storing the transmission frequency of the received signal as the initial value before initiating a charging operation.

9. The method of claim 1, further comprising:
   determining the transmission frequency of the received signal by one or more of measuring pulse-width, determining a time interval between successive rising edges, and counting a number of pulses received within a time period.

10. A system for determining a change in temperature of an implantable electronic device, the system comprising:
    an implantable electronic device configured to transmit a signal, wherein a transmission frequency of the transmitted signal corresponds to an output frequency associated with a non-crystal oscillator included in the implantable electronic device; and
    an external controller including processor electronics configured to perform operations comprising:
      receiving the transmitted signal;
      comparing the transmission frequency of the transmitted signal with an initial value to detect a frequency shift; and determining a change in temperature of the implantable electronic device based on the detected frequency shift.

11. The system of claim 10, wherein the implantable electronic device and the external controller are inductively coupled through an electromagnetic field.

12. The system of claim 11, wherein the processor electronics included in the external controller are further configured to perform operations comprising:

adjusting a strength of the electromagnetic field based on the determined change in temperature.

13. The system of claim 10, wherein the transmitted signal comprises an unmodulated signal.

14. The system of claim 10, wherein the initial value comprises a transmission frequency of a signal transmitted by the implantable electronic device prior to a charging operation.

15. The system of claim 10, wherein the processor electronics included in the external controller are further configured to perform operations comprising:

factoring out of the detected frequency shift a component corresponding to one or more of (i) aging of the implantable electronic device and (ii) a voltage change in a rechargeable power source included in the implantable electronic device.

16. The system of claim 10, wherein the output frequency associated with the non-crystal oscillator comprises a center frequency of the non-crystal oscillator.

17. The system of claim 10, wherein the processor electronics included in the external controller are further configured to perform operations comprising:

storing the transmission frequency of the transmitted signal as the initial value before initiating a charging operation.

18. The system of claim 10, wherein the processor electronics included in the external controller are further configured to perform operations comprising:

determining the transmission frequency of the transmitted signal by one or more of measuring pulse-width, determining a time interval between successive rising edges, and counting a number of pulses received within a time period.

19. The system of claim 10, wherein the non-crystal oscillator comprises one of a ring-oscillator and a resistor-capacitor oscillator.

20. A method comprising:

providing power to a non-crystal oscillator associated with an implantable electronic device;

detecting an output frequency associated with the non-crystal oscillator;

comparing the detected output frequency with a stored output frequency value associated with the non-crystal oscillator to detect an output frequency shift; and determining a change in temperature of the implantable electronic device based on the detected output frequency shift.

21. The method of claim 20, further comprising:

adjusting a field strength associated with a charging field based on the determined change in temperature.

22. The method of claim 20, further comprising:

factoring out of the detected output frequency shift a component that corresponds to one or more of (i) aging of the implantable electronic device and (ii) a change in a rechargeable power source voltage associated with the implantable electronic device.

23. The method of claim 20, wherein the output frequency associated with the non-crystal oscillator comprises a center frequency.

* * * * *